(12) United States Patent
Metzger

(10) Patent No.: US 10,927,708 B2
(45) Date of Patent: Feb. 23, 2021

(54) ISOLATED TURBINE ENGINE COOLING

(71) Applicant: Rolls-Royce North American Technologies Inc., Indianapolis, IN (US)

(72) Inventor: Nicholas Dwain Metzger, Fishers, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 176 days.

(21) Appl. No.: 16/173,387

(22) Filed: Oct. 29, 2018

(65) Prior Publication Data
US 2020/0131933 A1    Apr. 30, 2020

(51) Int. Cl.
*F01D 25/14* (2006.01)
*B64D 27/10* (2006.01)
(Continued)

(52) U.S. Cl.
CPC .......... *F01D 25/145* (2013.01); *B64D 27/10* (2013.01); *B64D 27/16* (2013.01); *F01D 21/00* (2013.01);
(Continued)

(58) Field of Classification Search
CPC .............. B64D 2033/024; B64D 33/08; B64D 2027/026; B64D 29/04; B64D 27/10; B64D 27/16; B64D 2027/02; F01D 25/145; F01D 21/00; F01D 25/08; F01D 24/14; F01D 25/26; B64C 7/02; F02C 7/12; F02C 7/16; F05D 2240/14; F05D 2240/15; F05D 2260/232; F05D 2260/20
See application file for complete search history.

(56) References Cited

U.S. PATENT DOCUMENTS 2,955,414 A * 10/1960 Hausmann ................ F02K 7/16
60/244
3,282,052 A * 11/1966 Lagelbauer ............... F02K 7/10
60/262
(Continued)

OTHER PUBLICATIONS

Buchmann, O.A., "Design and Anaiysis of a Scramjet Engine", AiResearch Manufacturing Company, Los Angeles California, pp. 66-117 https://ntrs.gov/search.jsp?R=19790013255.

*Primary Examiner* — J. Todd Newton
*Assistant Examiner* — Andrew J Marien
(74) *Attorney, Agent, or Firm* — Brinks Gilson & Lione

(57) ABSTRACT

A hybrid propulsion system and methods for cooling the same are provided. The system may comprise a gas turbine and a secondary engine. The gas turbine engine may have a core passage and an engine compartment. The secondary engine may be a supersonic and/or hypersonic engine. The system may comprise a thermal barrier, an inlet and an exhaust. The thermal barrier may longitudinally envelope the gas turbine engine. The thermal barrier may comprise an inner envelope, an outer envelope, an upstream opening, and a downstream opening. The inlet may be in fluid communication with the ambient environment and the gas turbine engine via the upstream opening. The exhaust may be in fluid communication with the ambient environment and the gas turbine engine via the downstream opening. The engine compartment may be located between a boundary of the core passage and the inner envelope.

20 Claims, 8 Drawing Sheets

(51) Int. Cl.
*B64D 27/16* (2006.01)
*F01D 21/00* (2006.01)
*F02C 7/12* (2006.01)
*B64D 27/02* (2006.01)

(52) U.S. Cl.
CPC .......... *F02C 7/12* (2013.01); *B64D 2027/026* (2013.01); *F05D 2240/14* (2013.01); *F05D 2240/15* (2013.01); *F05D 2260/232* (2013.01)

(56) References Cited

U.S. PATENT DOCUMENTS

| | | | |
|---|---|---|---|
| 4,275,857 A | 6/1981 | Bergsten | |
| 4,919,364 A * | 4/1990 | John | B64D 27/20 |
| | | | 244/53 B |
| 4,934,632 A * | 6/1990 | Kim | B64C 30/00 |
| | | | 244/12.1 |
| 5,347,807 A * | 9/1994 | Brossier | F02K 3/075 |
| | | | 137/15.1 |
| 7,762,077 B2 * | 7/2010 | Pederson | B64C 30/00 |
| | | | 60/767 |
| 8,429,893 B2 | 4/2013 | Rupp et al. | |
| 9,103,280 B2 | 8/2015 | Rupp et al. | |
| 9,109,539 B2 * | 8/2015 | Duge | F02K 3/02 |
| 9,752,453 B2 | 9/2017 | Rupp et al. | |
| 10,233,867 B2 * | 3/2019 | Lovett | F01D 17/143 |
| 2016/0326915 A1 * | 11/2016 | Baladi | F01D 25/24 |
| 2019/0186299 A1 * | 6/2019 | Leroux | F01D 21/00 |

* cited by examiner

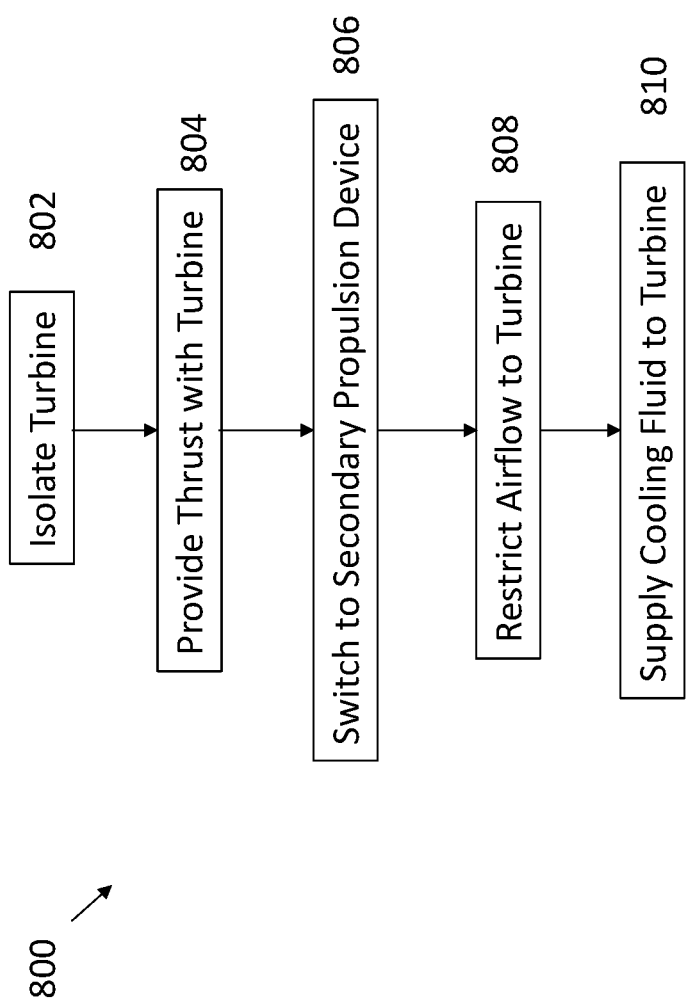

ISOLATED TURBINE ENGINE COOLING

BACKGROUND

Combustion engines typically have cooling systems to maintain components of the engine at safe temperatures during operation. Without a cooling system, the temperature of a component may rise sufficiently high to have adverse effects on the material properties of the materials. For example, a metal alloy may have a lower strength at higher temperatures, or electrical insulation may become brittle.

Upon shutdown, active cooling systems are often also shutdown. For example, a gas turbine engine may be cooled by internally flowing air during operation. When the gas turbine engine is shutdown, the flow of air over the engine is substantially reduced and may be negligible. Thermal soak back may occur in an engine during a shutdown period. During thermal soak back, heat may be transferred, or soak, from components that are maintained at higher temperatures during operations to other components maintained at lower temperatures. For example, heat from the turbine section may soak toward components in the combustion chamber like fuel injectors. This heat soak in a typical gas turbine engine is usually released into the ambient environment via natural convention and thermal radiation.

SUMMARY

According to some aspects of the present disclosure, a hybrid propulsion system is provided. The system may comprise a gas turbine and a secondary engine. The gas turbine engine may have a core passage and an engine compartment. The secondary engine may be a supersonic and/or hypersonic engine. The system may further comprise a thermal barrier, an inlet and an exhaust. The thermal barrier may longitudinally envelope the gas turbine engine. The thermal barrier may comprise an inner envelope, an outer envelope, an upstream opening, and a downstream opening. The inlet may be in fluid communication with the ambient environment and the gas turbine engine via the upstream opening. The exhaust may be in fluid communication with the ambient environment and the gas turbine engine via the downstream opening. The engine compartment may be located between a boundary of the core passage and the inner envelope and may extend at least between the upstream opening and the downstream opening.

According to some aspects of the present disclosure, a hybrid propulsion system is provided. The system may comprise a gas turbine engine and a secondary engine. The gas turbine engine may include a core passage having a compressor, combustion chamber, and a turbine. The secondary engine may be a supersonic and/or hypersonic engine. The system may further comprise a thermal barrier. The thermal barrier may longitudinally envelop the gas turbine engine. The thermal barrier may include an inner envelope an outer envelope, a passage between the inner envelope and outer envelope, an upstream opening, a downstream opening, a cooling fluid inlet, and a cooling fluid exit nozzle. The cooling fluid inlet may be proximate to the downstream opening. The cooling fluid exit nozzle may be proximate to the upstream opening. The cooling fluid inlet may be in fluid communication with the cooling fluid exit nozzle via the passage. The system may further comprise an inlet in fluid communication with the ambient environment and the gas turbine engine via the upstream opening, and an exhaust in fluid communication with the ambient environment and the gas turbine engine via the downstream opening.

According to some aspects of the present disclosure, a method of isolating, or cocooning, a gas turbine engine of a supersonic and/or hypersonic aircraft is provided. The method may comprise isolating the gas turbine engine, providing thrust with the gas turbine engine, switching from the gas turbine engine to a secondary propulsion device, restricting air flow through the gas turbine engine, supplying a cooling fluid into a passage, and spraying the cooling fluid from the passage into the gas turbine engine. Isolating the gas turbine engine may comprising isolating the gas turbine engine from the airframe of the aircraft with a double walled barrier that defines a passage between the inner and outer walls.

BRIEF DESCRIPTION OF THE DRAWINGS

The following will be apparent from elements of the figures, which are provided for illustrative purposes.

FIG. 8 is method of cocooning a turbine in accordance with some embodiments in the present disclosure.

Figure 1:
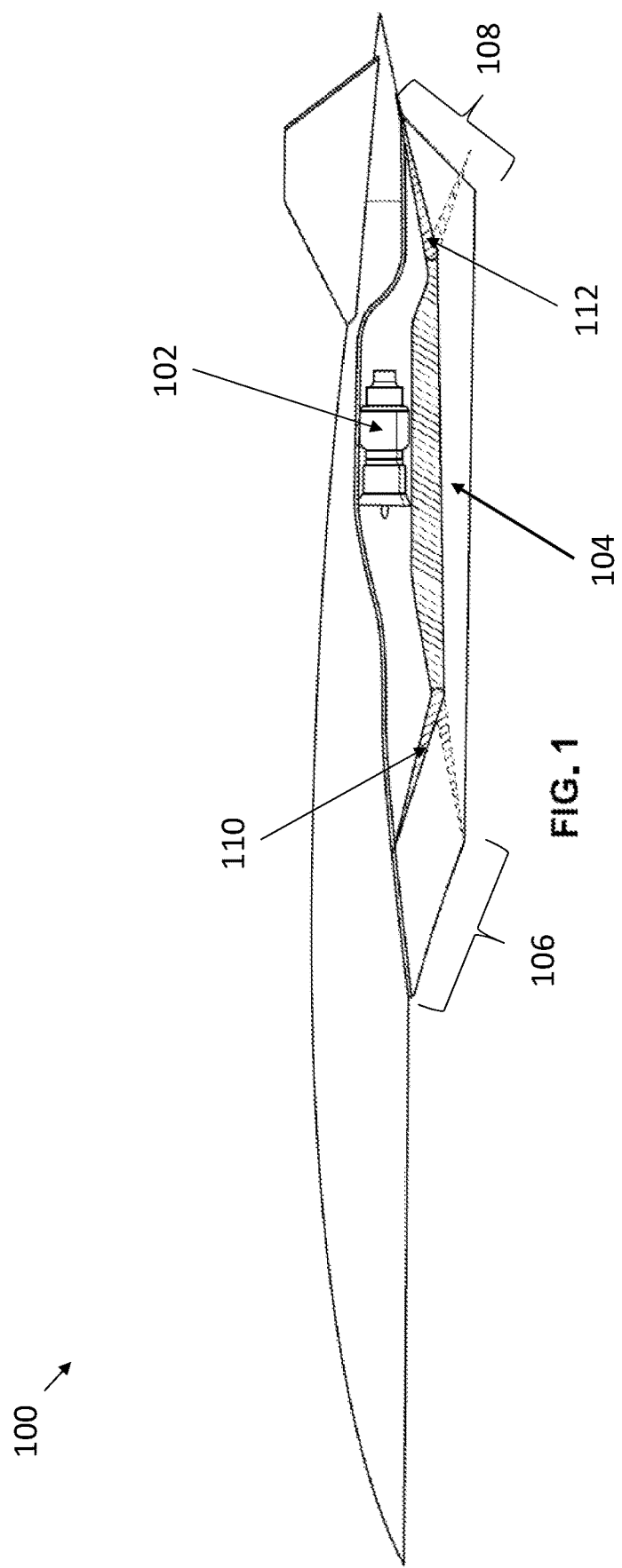
FIG. 1 is an illustration of a turbine-based combined-cycle propulsion aircraft in accordance with some embodiments in the present disclosure.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

As described in the various embodiments herein, systems and methods for cooling an isolated turbine engine are provided. In a typical gas turbine engine, thermal soak occurs concern when the engine is in a shutdown condition due to the absence of the internal, cooling air flow that is provided by the engine during operations. While the engine is shutdown, the airframe is typically on the ground. Heat from the engine is able to escape to the environment by natural convection and thermal radiation. These heat transfer paths are not available or are inadequate for an isolated gas turbine engine.

In accordance with some embodiments in the present disclosure, a turbine-based combined cycle propulsion system 100 is illustrated in FIG. 1. The combined cycle propulsion system 100 may comprise a turbine engine 102 (e.g., a gas turbine engine) and a secondary propulsion system 104. The combined cycle propulsion system 100 may be referred to as a hybrid propulsion system. The secondary propulsion system 104 may be, for example, a ramjet, a scramjet, etc., capable of operating at supersonic and or hypersonic speeds. The turbine 102 and secondary propulsion system 104 may share a common inlet 106 and a common exhaust 108. Whether air is directed to and exhausted from the turbine 102 or the secondary propulsion system 104 is determined by the position of diverters 110 and 112. The turbine engine 102 may be used to propel the aircraft from lower speeds (including takeoff and landing) up to speeds at which the secondary propulsion system 104 can produce thrust on its own.

After the secondary propulsion system 104 begins propelling the aircraft, typically at hypersonic speeds, the turbine engine 102 is shut down and air may no longer be supplied to the turbine 102. The turbine engine 102 is typically unable to operate at the hypersonic speeds attainable by the secondary propulsion system 104. Additionally, the turbine engine 102 may be separated from, or cocooned, the incoming air to promote efficient operation of the secondary propulsion system 104. Isolating the turbine engine 102 from all or a majority of the incoming air deprives the turbine 102 of a heat sink. While the engine is isolated, the previously-operating turbine 102 may be subjected to thermal soak back and also to heat transferred from the secondary propulsion system 104 or from other components of the aircraft (for example, from the skin of the aircraft due to aerodynamic heating). This heat, from both the thermal soak back and other aircraft components, is advantageously removed from the turbine 102 to avoid the adverse effects described above.

While an arrangement of the turbine 102 and secondary propulsion system 104 is shown in FIG. 1, the general and operating characteristics described above should not be limited to the particular arrangement shown. For example, in some embodiments, the turbine 102 may be located outboard of the secondary propulsion system 104 that may be more embedded in the airframe. In some embodiments, one or more of the turbine 102 and secondary propulsion system 104 may be located in an engine nacelle rather than being embedded in the airframe. The engine nacelle may be connected to a wing, a major compartment (e.g., the passenger compartment, or the body of the aircraft.

Figure 2:
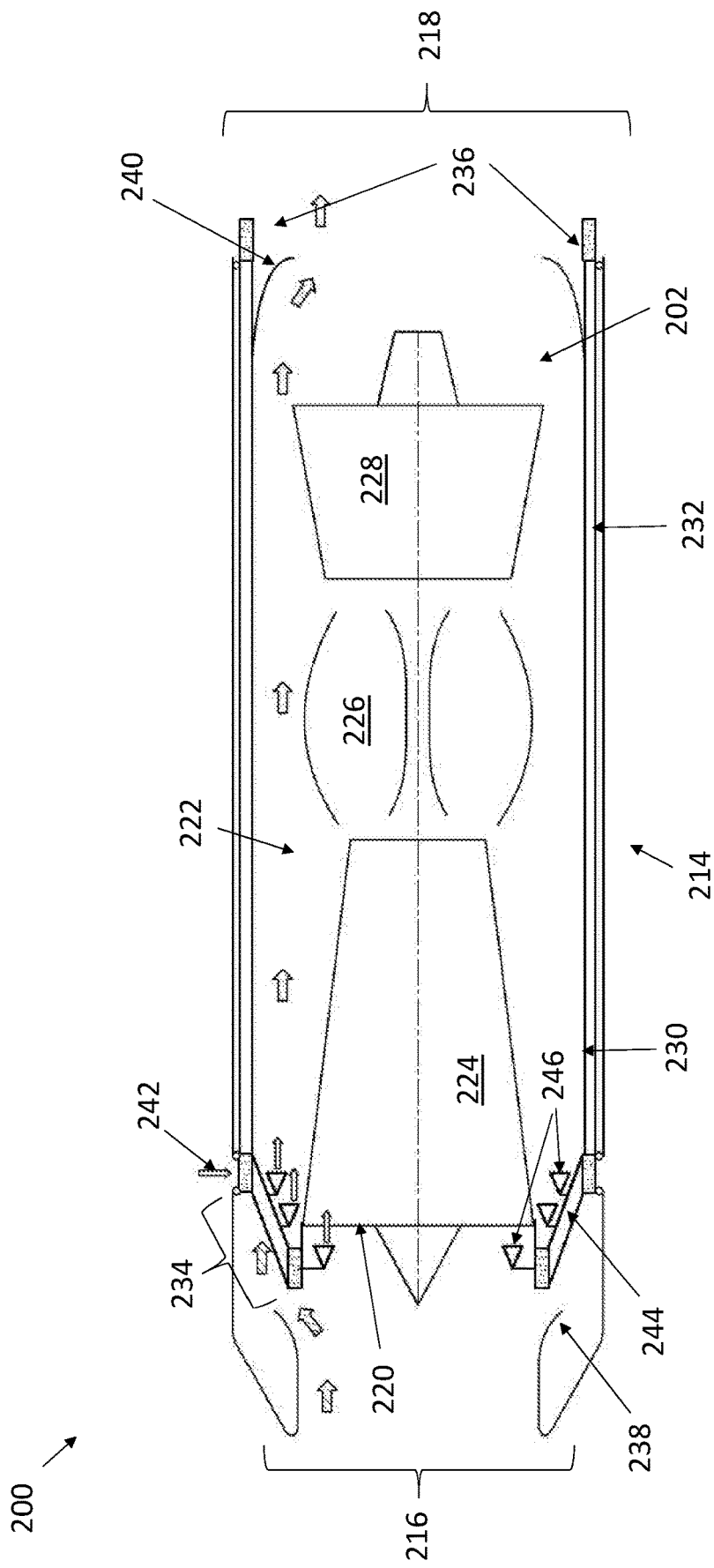
FIG. 2 is an axial cross section of a system for cooling an isolated turbine engine of a turbine-based combined cycle aircraft.

In accordance with some embodiments, a system 200 for cooling an isolated turbine engine of a turbine-based combined cycle aircraft is provided for in FIG. 2. The system may include a turbine 202 (e.g., a gas turbine engine), a thermal barrier 214, an inlet 216, and an exhaust 218.

Turbine 202 may be used to propel an aircraft (not shown) at relatively lower speeds as described above in regards to FIG. 1. The turbine 202 may include a core passage 220 and an engine compartment 222. The core passage 220 may comprise a compressor 224, combustion chamber (or combustor) 226, and a turbine 228. The core passage 220 may comprise a boundary that is defined by the radially outer surface of the compressor 224, combustion chamber (or combustor) 226, and a turbine 228. This radially outer surface of the core passage 220 may define the radially inner surface of the engine compartment 222 volume.

The engine compartment 222 may be defined by the boundaries created by the core passage 220 and the inner envelope 230 such that it is located between the core passage 220 and the inner envelope 230. The engine compartment 222 may be further defined by the upstream opening 234 and downstream opening 236 of the thermal barrier 214.

The thermal barrier 214 may function as a barrier to the unintended transfer of heat from the gas turbine 202 to other aircraft components (e.g., the aerodynamically heated skin and/or secondary propulsion system) and vice versa particularly when the aircraft is shut down and isolated from the cooling air flow provided to the turbine 202 when it is operating. To perform its barrier function, the thermal barrier 214 may include an inner envelope 230, an outer envelope 232, an upstream opening 234, and a downstream opening 236. The inner envelope 230 and outer envelope 232 may be sealed to one another at a forward end and at an aft end such that a vacuum can be drawn between the two envelopes 230, 232. Drawing a vacuum between the inner envelope 230 and outer envelope 232 prevents any conduction and convection heat transfer between the two. An insulated material may also be used between the inner envelope 230 and the outer envelope 232. One or both of the inner envelope 230 and outer envelope 232 may be coated or have a surface finish that reduces radiative heat transfer between the two envelopes, between the inner envelope 230 and the turbine 202, between the outer envelope 232 and other engine components, or any combination of the foregoing.

The inner envelope 230 and outer envelope 232 may form concentric cylinders, with the outer envelope 232 being located outward of the inner envelope 230. In some embodiments, the cylinders may have a constant radius from the forward and aft ends of the inner envelope 230 and outer envelope 232, while in other embodiments the radius may change to, for example, accommodate other aircraft components located outside of the thermal barrier 214 or to follow the boundary defined by the core passage 220.

The inner envelope 230 and outer envelope 232 may extend along the axis of the turbine 202 for all or a portion of the axial length of—or longitudinally envelope—the turbine 202. Additionally, the inner envelope 230 and outer envelope 232 may extend around all or a portion of the circumference of the turbine 202. In those embodiments in which the inner envelope 230 and outer envelope 232 extend around only a portion of the circumference of the turbine 202, the inner envelope 230 and outer envelope 232 are positioned such that they at least isolate the hot portions of turbine 202 and/or the source of heat (e.g., the aerodynamically heated skin of the aircraft and/or the secondary propulsion system 104) from heat sensitive portions of the airframe and/or turbine. The inner envelope 230 and outer envelope 232 each may extend to and define the upstream opening 234 and downstream opening 236.

While the thermal barrier 214 functions to, ideally, prevent heat transfer between the turbine 202 and other aircraft components, it is advantageous to actively cool the turbine 202. After shutting down, turbine 202 may experience thermal soak back after being shut down. This thermal soak back may cause portions of the turbine 202 to rise above the design temperatures of certain components which could affect the material properties adversely. For example, electrical insulation may become brittle and more susceptible to failure and electrical components may overheat. These problems are exacerbated by the isolation of turbine 202, necessary to protect the aircraft and/or turbine 202 from respective heat loads that remain as the aircraft travels at supersonic and hypersonic speeds.

To address this heat removal problem, system 200 is provided with components that provide for a heat sink for any heat that remains in the engine during shutdown and for heat that may be transferred to the turbine 202 once the aircraft is powered by the secondary propulsion system 104. These components may include the upstream opening 234 and downstream opening 236, and the inlet 216 and exhaust 218.

As can be seen in FIG. 2, the upstream opening 234 may be defined by an annual duct proximate to the forward end of thermal barrier. This annual duct may extend around all or a portion of the thermal barrier 214, which, as described above, may be located radially outward of the engine 202 around all or part of the circumference on the engine 202. The upstream opening 234 may be in fluid communication with the inlet 216 and the engine compartment 222 of the turbine 202 such that a flow of ambient air may be provided from the environment, directly or indirectly, to the engine compartment 222 via the upstream opening 234. The pathway for supplying this ambient air may also be referred to as a main gas path air offtake and is typically located forward of the turbine 202. A relatively small amount the ambient air may then flow in the engine compartment 222 past turbine 202, thereby removing heat from the turbine 202 via convection. The ambient air may then exit the engine compartment 222 to the environment via the downstream opening 236. The exhaust 218 may be in fluid communication with both the ambient environment and the engine compartment 222 via the downstream opening 236.

In some embodiments, the inlet 216 may comprise inlet flow deflectors 238, and exhaust 218 may comprise exhaust flow deflectors 240. The inlet flow deflectors 238 and exhaust flow deflectors 240 may function to limit the flow of ambient air into the engine compartment 222 and restrict the air flow within the engine compartment 222, respectively, and also limit or restrict airflow through the core passage 220 of the gas turbine 202. In some embodiments, ambient air may be provided to core passage 220 of turbine 202 to provide additional cooling thereto. Air flowing through the core passage 220 may be combined with the air flowing in the engine compartment prior to being exhausted through the downstream opening and exhaust 218 to the environment.

In accordance with some embodiments, a cooling fluid 242 may be mixed with the ambient air. The cooling fluid 242 may be mixed with the ambient air in mixing channels 244. The cooling fluid 242 may atomize or vaporize in the ambient air. The vaporization of the cooling fluid 242 will cause the overall temperature of the cooling fluid 242/ambient air mixture to lower, thereby increasing the cooling capacity of the system 200. The cooling fluid 242 may be any suitable fluid, for example, bleed air, water, fuel, or a refrigerant. Cooling fluid 242 may be provided from any suitable source, e.g., a pressurized tank.

Mixing channels 244 may be disposed between and connect the walls of thermal barrier 214 and the turbine engine 202, either directly or via some structure supporting the turbine 202. The mixing channel may extend between the forward end of the thermal barrier walls and the core passage 220 of the turbine 202. The mixing channel 244 may comprise channels and structures that introduce a swirl in the ambient air entering the engine compartment through the upstream opening 234 of the thermal barrier 214. Additionally, the mixing channel 244 may comprise a series of ducts, holes, or nozzles that introduce the cooling fluid 242 into the turbulent air, thereby ensuring better mixing of the two fluids. Like the thermal barrier 214, the mixing channel 244 is located radially outboard of the turbine 202 and may extend around all or a portion of the circumference of the turbine 202.

In addition to the mixing channel 244, the cooling fluid 242 may be introduced to the ambient air flowing in system 200 via a series or plurality of nozzles 246. Nozzles 246 may be located in various locations within system 200. As shown in FIG. 1, nozzles may be located downstream of the mixing channel proximate to the upstream opening 234 of thermal barrier 214, as well as near the inlet of core passage 220. Supplying the cooling fluid 242 via nozzles 246 to the core passage 220 will help maintain the core passage 220 temperature at the desired level should any air leak into the core passage 220 when the turbine 202 is not operating. In some embodiments, nozzles 246 may be located within the core passage 220 and in more downstream locations within the engine compartment 222. These additional locations may be proximate to the hotter operating portions of turbine 202 (for example, the turbine 228 and other components downstream of combustor 226) or just upstream of the hotter portions to ensure adequate heat removal prior to the transfer of that heat to other components. Other locations for additional nozzles 246 may include those locations that experience a higher heat influx to the turbine 202 from the airframe or secondary propulsion system 104 when that system 104 is operating. In some embodiments nozzles 246 may be located within or upstream of mixing channel 244. Other locations may include those shown in FIGS. 4-6.

The total amount of cooling fluid 242 provided to the system 200, or to any particular nozzle 246 or the mixing channel 244 may be controlled to achieve a desired temperature of the cooling fluid 242 air mixture in order to achieve the desired cooling of the turbine 202. In some embodiments, the amount of ambient air provided to system 200 is also controlled.

After flowing through engine compartment 222 and/or core passage 220, the cooling fluid 242 ambient air mixture flows to the turbine 202 exhaust 218 via the downstream opening 236 and is eventually vented to a low pressure sink (e.g., the atmosphere).

Figure 3:
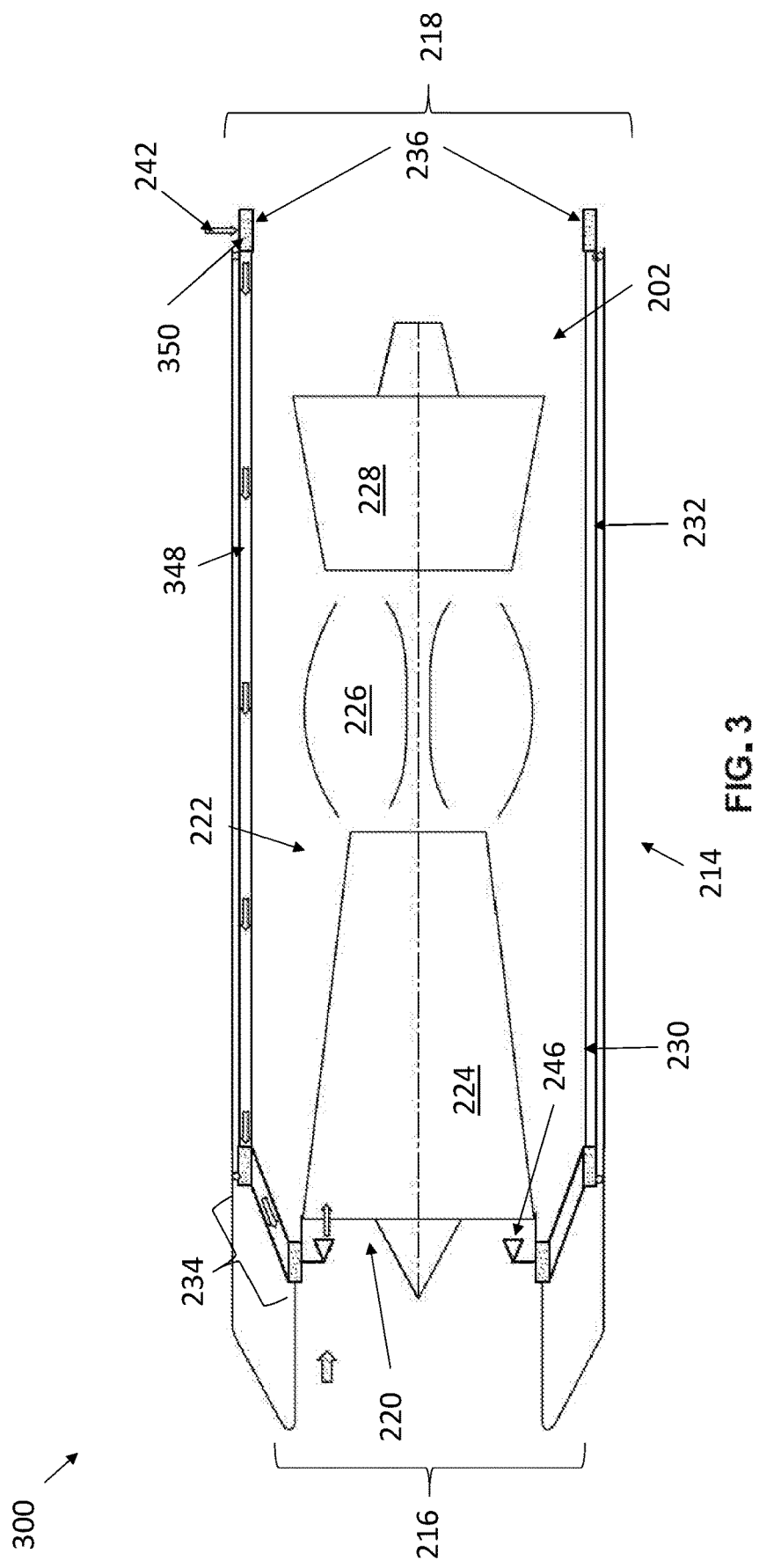
FIG. 3 is an axial cross section of a system for cooling an isolated turbine engine of a turbine-based combined cycle aircraft in accordance with some embodiments in the present disclosure.

In accordance with some embodiments in the present disclosure, a system 300 for cooling an isolated turbine engine of a turbine-based combined cycle aircraft is provided in FIG. 3. System 300 may comprise various components similar to those described above for system 200. Each of these components, except as noted below, may perform the same functions and have the same features of those components as described above.

System 300 may comprise several differences form the system 200 described above. For example, cooling fluid 242 may be supplied to a passage defined by the inner envelope 230 and outer envelope 232 rather than drawing a vacuum between the walls of the thermal barrier 214. The cooling fluid may enter at an inlet 350 to the passage 348. This inlet 350 may be located proximate to the downstream opening 236 of the thermal barrier 214. The cooling fluid 242 may then flow forward through the passage 348 to nozzles 246, with which the passage 348 is in fluid communication. The cooling fluid may then combine with ambient air and flow through the core passage 220 prior to being expelled to the environment via exhaust 218 and the downstream opening 236.

System 300 may not have the upstream opening 234 in the thermal barrier 214, nor the mixing channel 244 because system 300 relies on removing heat from the turbine 202 via the core passage 220 alone.

Figure 4:
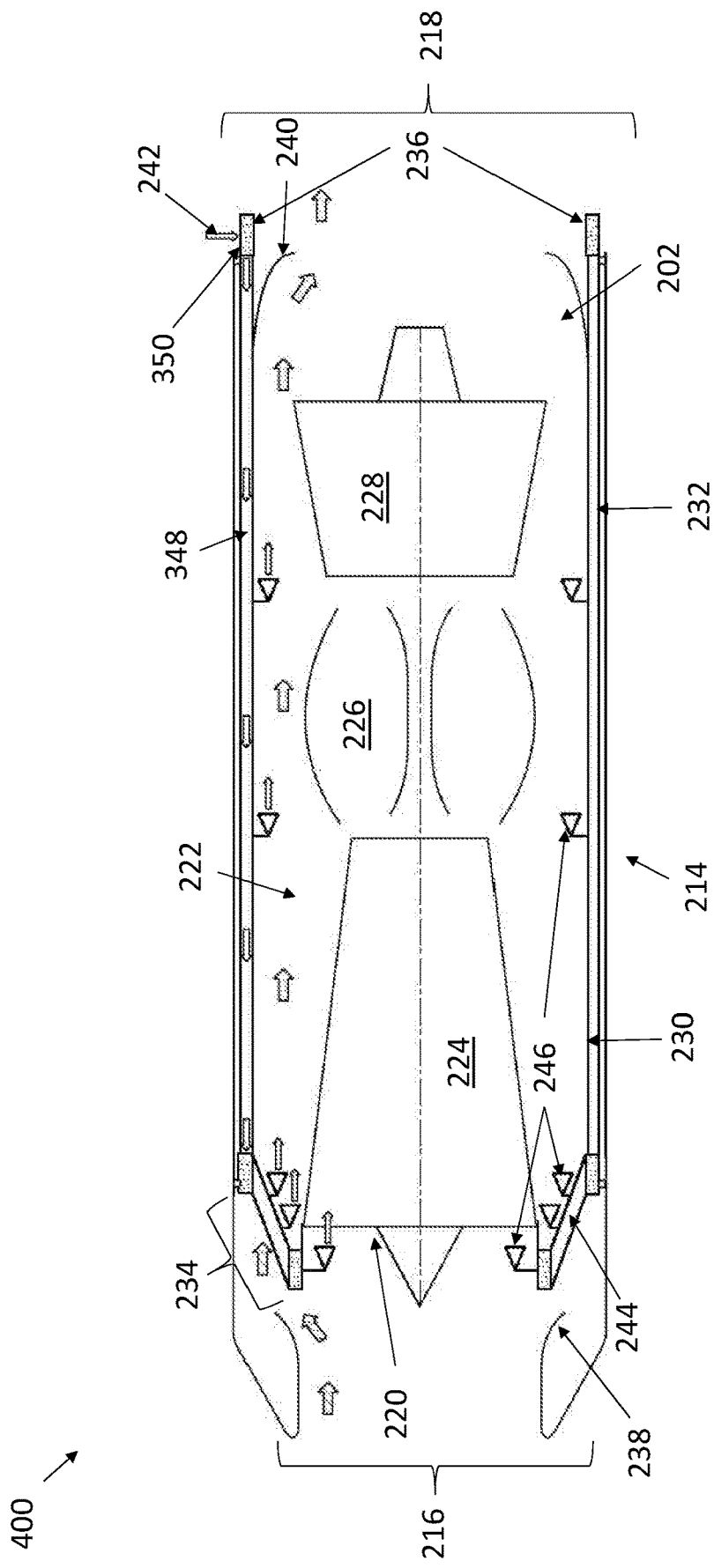
FIG. 4 is an axial cross section of a system for cooling an isolated turbine engine of a turbine-based combined cycle aircraft in accordance with some embodiments in the present disclosure.

In accordance with some embodiments in the present disclosure, a system 400 for cooling an isolated turbine engine of a turbine-based combined cycle aircraft is provided in FIG. 4. System 400 may comprise the components as described above for systems 200 and 300, with each component performing the same function and having the same features of those described above.

System 400 combines the engine compartment 222 cooling as described with respect to system 200 with the cooling fluid 242 filled passage 348 of system 300. Additionally, System 400 provides additional locations in which nozzles 246 may be disposed. Nozzles 246 may be in direct fluid communication with passage 348 that provides the cooling fluid 242 to those nozzles. By supplying the cooling fluid 242 to system 400 via the passage 348, additional plumbing that would be required to provide cooling fluid 242 to the nozzles further aft along the turbine 202 can be avoided. The further aft nozzles 246 may be aligned with the hotter sections of the turbine 202 is additional cooling is needed for those sections.

In some embodiments a ratio of the radius of the inner envelope 230 and outer envelope 232 may be constant between the forward and aft ends of the inner envelope 230 and outer envelope 232. In some embodiments the ratio of the radius of the inner envelope 230 and outer envelope 232 may change between the forward and aft ends of the inner envelope 230 and outer envelope 232. The inner envelope 230 and outer envelope 232 may be referred to together as a double walled cylinder. By changing the distance between the inner envelope 230 and outer envelope 232, a more consistent pressure of cooling fluid 242 may be able to achieved. It is also envisioned that the double walled thermal barrier will take on an irregular shape to conform more closely with the cocooned gas turbine 202.

Figure 5:
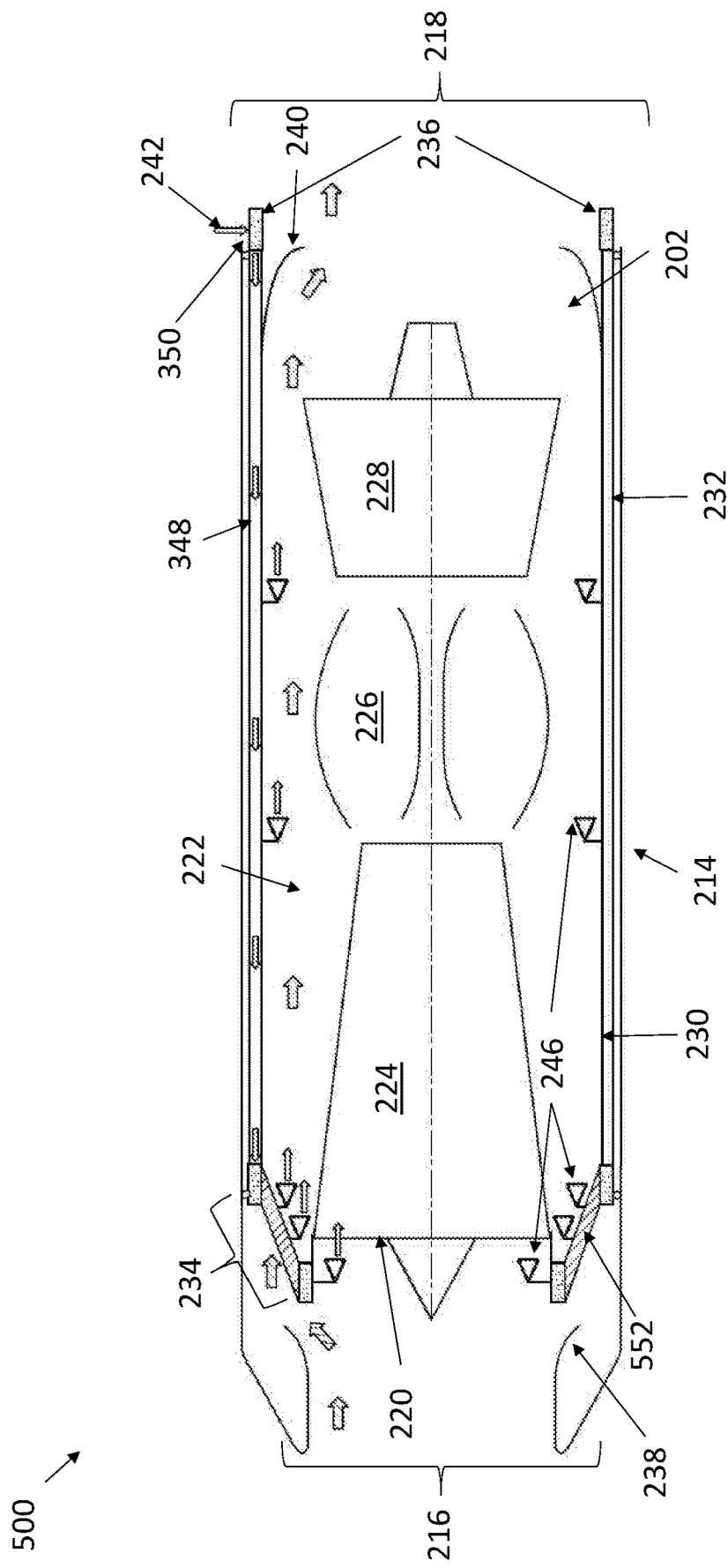
FIG. 5 is an axial cross section of a system for cooling an isolated turbine engine of a turbine-based combined cycle aircraft in accordance with some embodiments in the present disclosure.

In accordance with some embodiments in the present disclosure, a system 500 for cooling an isolated turbine engine of a turbine-based combined cycle aircraft is provided in FIG. 5. System 500 may comprise the same components performing the same functions and having the same features as described above for systems 200, 300 and 400. System 500 most closely resembles system 400, although the mixing channel 244 of system 400 has been replaced with the heat exchanger 552. Heat exchanger 552 removes heat from the ambient air provided from the environment to the engine compartment 222 via inlet 216 and the upstream opening 234. Like the mixing channel 244 and thermal barrier 214, heat exchanger 552 may be located radially outward of all or a portion of the core passage 220 proximate to the forward end of turbine 202. By cooling the ambient air prior to its mixing with cooling fluid 242 provided by the nozzles 246 downstream of the heat exchanger 552, less cooling fluid 242 may be needed in order to provide for the required cooling in the engine compartment 222.

Heat exchanger 552 is in fluid communication with passage 348 and the nozzle(s) 246 located upstream of the core passage 220.

In some embodiments, a heat exchanger 552 and mixing channel 244 are both provided, with one of these components located upstream from the other.

Figure 6:
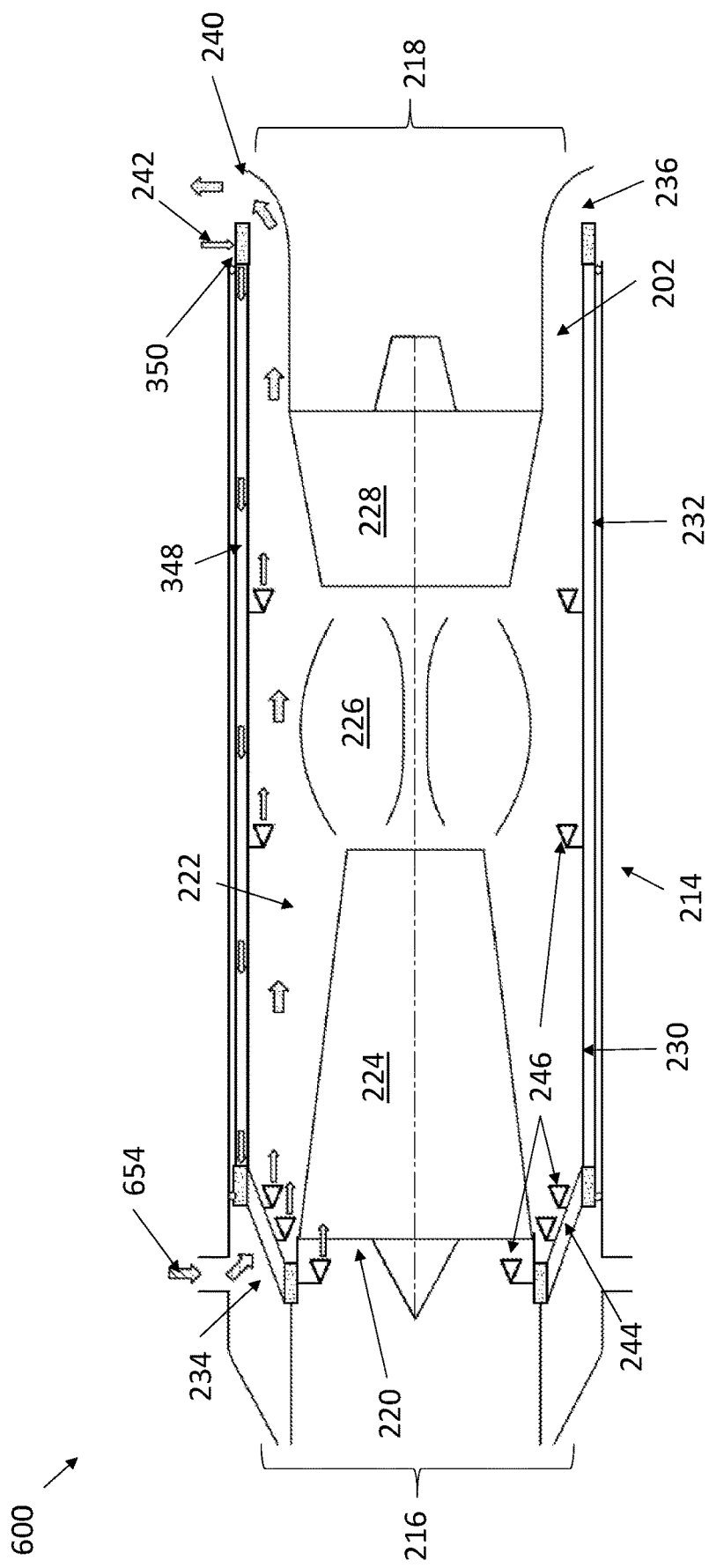
FIG. 6 is an axial cross section of a system for cooling an isolated turbine engine of a turbine-based combined cycle aircraft in accordance with some embodiments in the present disclosure.

In accordance with some embodiments in the present disclosure, a system 600 for cooling an isolated turbine engine of a turbine-based combined cycle aircraft is provided in FIG. 6. System 600 may comprise the same components performing the same functions and having the same features as described above for systems 200, 300, 400, 500, and 600. System 600 introduces two features not shown in, but compatible with other systems disclosed here. First, a dedicated air source 654 is provided in place of the ambient air bleed shown in the other systems described here. However, it should be understood that any ambient air flow could be replaced by air source 654. Air source 654 may be, for example, a high pressure container that is able to provide air at a lower temperature than that taken from the ambient air.

Second the exhaust flow deflector 240 may exhaust the cooling fluid 242/air mixture from the engine compartment 222 via a downstream opening proximate to exhaust 218, which may be the main exhaust used by turbine 202 while it is operating.

As described above, various systems having components, and cooling fluid 242 and/or air supplied to the turbine 202 are used to remove heat. The various components and fluid flows may be individually controlled via a controller that may be integrated in the Full Authority Digital Engine Control (FADEC) of turbine 202 or by a separate controller. For example, if more cooling is needed in the engine compartment, or a particular location within the engine compartment 222, the controller may function to increase the flow of the cooling fluid 242 to the appropriate nozzle 246, mixing channel 244 or heat exchanger 552. Additionally or alternatively, the controller may function to increase the flow of ambient air or the dedicated air source.

While the heat removed from the turbine 202 may be immediately rejected to the environment, the heat may also be used in any of a variety of power cycles in order to provide the aircraft with power. This ability is particularly useful during scramjet/ramjet powered flight because neither engine uses a rotating shaft from which mechanical energy can be extracted in order to power a generator.

Figure 7:
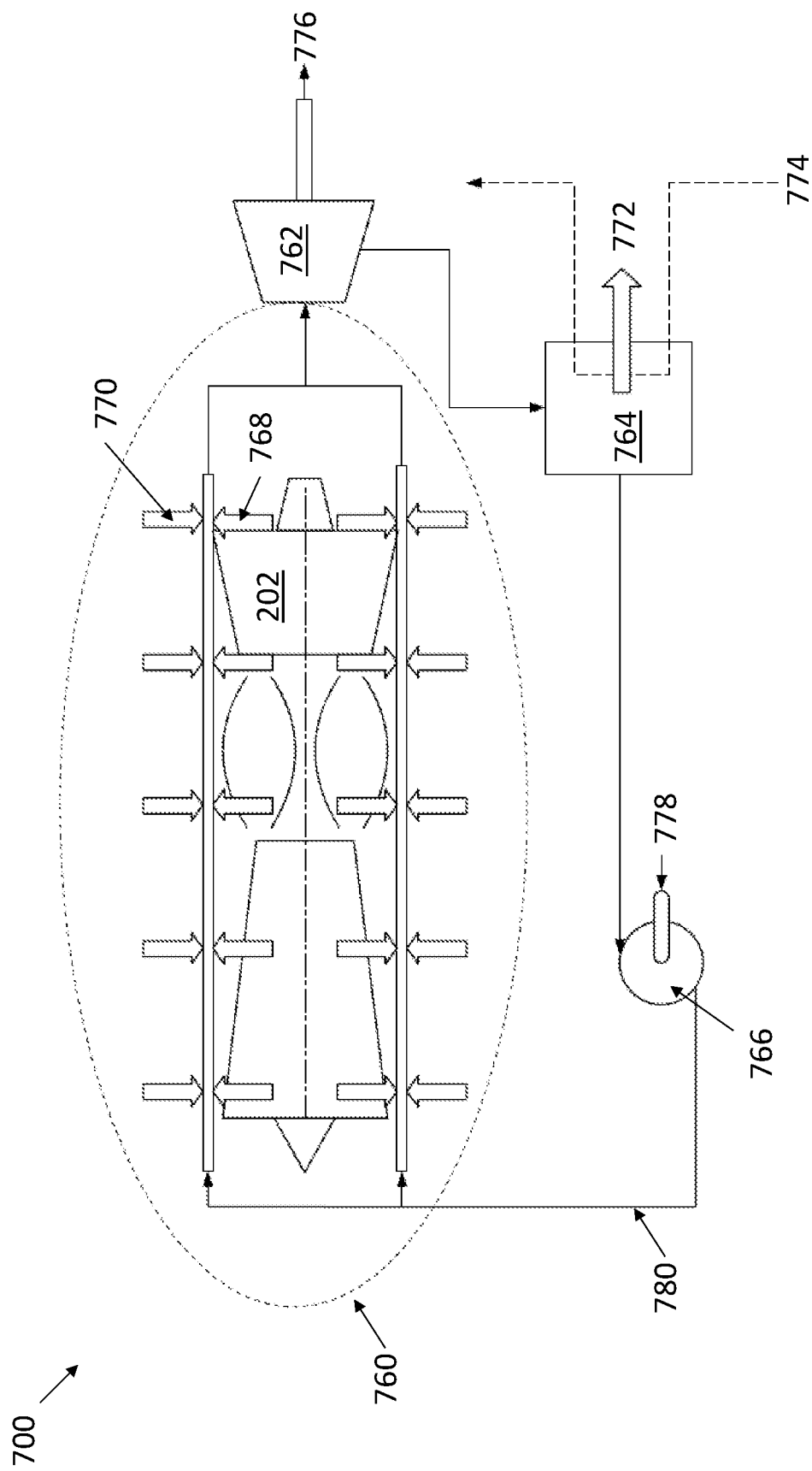
FIG. 7 is an illustration of a Rankine cycle utilizing heat input from a turbine-based combined cycle aircraft in accordance with some embodiments in the present disclosure.

In accordance with some embodiments in the present disclosure, a system 700 that uses the turbine 202 of the turbine-based combined cycle aircraft as a heat source is provided in FIG. 7. The system 700 may comprise a cooling system 760, expander (or expansion device) 762, condenser 764, and pump 766. One of ordinary skill will recognize system 700 as a Rankine cycle. Cooling system 760 may comprise components similar to those described above for systems 200, 300, 400, 500 and 600 performing similar functions and providing similar features. However, it should be recognized that after heat 768 from the turbine 202 is transferred into the air, cooling fluid 242, or a mixture of both, that fluid is captured (or heat from that fluid is captured by, for example, a heat exchanger) and used as the working fluid in system 700. Heat 770 may also be discarded from the secondary propulsion system, aerodynamic heating of the aircraft, or other components and supplied to the working fluid of system 700. The heated working fluid is provided to expander 762 that extracts work 776 from the fluid. Condenser 764 then removes heat 772 from working fluid by, for example, removing it fuel flow line 774 prior to the fuel being supplied to the turbine-based combined cycle system. The working fluid is received from the condenser 764 by a pump 766 that returns the working fluid to cooling system 760. Power 778 for the pump 766 may be supplied either from the expander 762 or from another source, such as a battery.

In accordance with some embodiments, the working fluid will flow to the expander directly after flowing through the passage 348 of the thermal barrier 214, and then to the condenser 764, pump 766, and back to the passage 348 creating a closed loop 780.

It should be noted that the above system 700 may function regardless of whether the turbine 202 or secondary propulsion system 104 is powering the aircraft. This may advantageously allow the removal of a dedicated generator drive off the shaft of turbine 202.

It should also be understood that the described Rankine cycle is but one manner in which electrical power can be generated from heat absorbed by the cooling system 760 and in particular the thermal barrier 214. For example, electrical power may be generated via a direct thermoelectric conversion.

In accordance with some embodiments in the present disclosure, a method 800 of cocooning the turbine engine within a turbine-based combined cycle propulsion system aircraft is provided in FIG. 8. The method 800 may include at block 802 isolating the turbine with a thermal barrier, at block 804 providing thrust with the turbine (i.e. operating the turbine to the transition speed, at block 806 switching to a secondary propulsion device (i.e. at the transition speed activating the secondary propulsion), at block 808 restricting airflow to the turbine, and at block 810 supplying a cooling fluid to the turbine.

At block 802, the turbine may be isolated from other portions of the aircraft. This may include placing the turbine within a system such as system 200, 300, 400, 500, 600, or 700 as described above. The system may include a double-walled cylinder that may define a passage between the walls for the flow of cooling fluid, or a vacuum may be drawn in the passage.

At block 804, the turbine may be used to provide thrust to the aircraft. This block may include receiving ambient air through an inlet to the turbine, compressing the air in a compressor, heating the air in a combustion chamber, expanding the air in a turbine, and exhausting the air through an exhaust to the environment.

At block 806, the aircraft may switch from providing thrust by the turbine to a secondary propulsion system. Which propulsion system is utilized is primarily dependent upon the speed of the aircraft. The turbine is used at lower speeds where it is more efficient. The secondary propulsion system is able to achieve higher speeds, and may not be able to function at the lower speeds at which the turbine is utilized.

At block 808 airflow to the turbine is restricted. Airflow may be restricted by moving diverters (such as those shown in FIG. 1) to close off the main air inlet and exhaust to the turbine and to open the main air inlet and exhaust secondary propulsion system.

At block 810, a cooling fluid is supplied to the turbine in order to remove heat from components caused by thermal soak back and heat from the airframe and/or secondary propulsion system. The cooling fluid may be cooling fluid 242, supplied to the turbine in the system and methods described above. The cooling fluid may be sprayed into a passage of the turbine engine, which may include the core passage of the turbine and/or the engine compartment of the turbine.

Method 800 may also include regulating the supply of cooling fluid to the passage as a function of the temperature of the turbine. This may include regulating the total supply of fluid, or the supply to individual nozzles, heat exchangers, and mixing channels. Additionally, a flow of air may be mixed with the cooling fluid to provide for better cooling of the turbine. The flow of air may also be regulated as a function of the temperature of the turbine. Regulation may occur as a function of the speed of the aircraft, the rate of fuel supplied to secondary propulsion device, or other suitable factor.

Method 800 may also include supplying the cooling fluid to a power generation system, such as that described above in regards to FIG. 7.

Although examples are illustrated and described herein, embodiments are nevertheless not limited to the details shown, since various modifications and structural changes may be made therein by those of ordinary skill within the scope and range of equivalents of the claims.

What is claimed is:

1. A hybrid propulsion system comprising:
a gas turbine engine, the gas turbine engine having a core passage and an engine compartment, the core passage including a compressor, combustion chamber and a turbine;
a hypersonic secondary engine;
a thermal barrier longitudinally enveloping the gas turbine engine, the thermal barrier including an inner envelope extending around a circumference of the gas turbine engine and along an axis of the gas turbine engine, an outer envelope extending around the circumference of the gas turbine engine and along the axis of the gas turbine engine,
wherein the inner envelop is concentric with the outer envelope, the outer envelope located radially outward of the inner envelope,
a vacuum between the inner envelope and the outer envelope, and
an upstream opening and a downstream opening;
an inlet in fluid communication with an ambient environment and the gas turbine engine via at least the upstream opening; and
an exhaust in fluid communication with the ambient environment and the gas turbine engine via at least the downstream opening, wherein the engine compartment is located between a boundary of the core passage and the inner envelope and extending at least between the upstream opening and the downstream opening.

2. The system of claim 1, further comprising an inlet flow deflector limiting ambient air into the engine compartment.

3. The system of claim 1, further comprising an exhaust flow deflector restricting flow in the engine compartment.

4. The system of claim 1, further comprising a plurality of nozzles within the engine compartment proximate to the upstream opening.

5. The system of claim 4, further comprising a cooling fluid source connected to the plurality of nozzles.

6. The system of claim 1, further comprising a plurality of mixing channels extending between the thermal barrier and the core passage at the upstream opening.

7. The system of claim 1, further comprising a plurality of nozzles within the core passage, the plurality of nozzles connected to a source to provide a cooling fluid.

8. The system of claim 7, wherein the cooling fluid is selected from the group consisting of bleed air, water, fuel and refrigerant.

9. The system of claim 1, wherein the hypersonic secondary engine comprises a ramjet engine or scramjet engine.

10. The system of claim 1, wherein the inner envelope and outer envelope are concentric cylinders.

11. A hybrid propulsion system comprising:
a gas turbine engine including a core passage having a compressor, combustion chamber and a turbine;
a hypersonic secondary engine;

a thermal barrier longitudinally enveloping the gas turbine engine, the thermal barrier including an inner envelope extending around a circumference of the gas turbine engine and along an axis of the gas turbine engine, an outer envelope extending around the circumference of the gas turbine engine and along the axis of the gas turbine engine, wherein the inner envelop is concentric with the outer envelope, the outer envelope located radially outward of the inner envelope, a passage between the inner envelope and the outer envelope an upstream opening and a downstream opening, a cooling fluid inlet in fluid communication with the passage, the cooling fluid inlet proximate to the downstream opening, and a cooling fluid exit nozzle in fluid communication with the passage, the cooling fluid exit nozzle proximate to the upstream opening, the cooling fluid inlet in fluid communication with the cooling fluid exit nozzle via the passage, the cooling fluid exit nozzle configured to receive cooling fluid from the cooling fluid inlet via the passage and supply the cooling fluid to the core passage; an inlet in fluid communication with an ambient environment and the gas turbine engine via at least the upstream opening; and an exhaust in fluid communication with the ambient environment and the gas turbine engine via at least the downstream opening.

12. The system of claim 11, wherein the gas turbine engine further comprises an engine compartment located between a boundary of the core passage and the inner envelope and extending at least between the upstream opening and the downstream opening.

13. The system of claim 12, further comprising a plurality of nozzles within the engine compartment.

14. The system of claim 13, wherein the plurality of nozzles are connected to the passage.

15. The system of claim 12, further including a source of cooling fluid, wherein the cooling fluid is selected from the group consisting of bleed air, water, fuel or refrigerant.

16. The system of claim 12, further comprising a plurality of heat exchanger supplied with cooling bleed air at the upstream opening and prior to a plurality mixing channels extending between the thermal barrier and the core passage at the upstream opening.

17. The system of claim 11, further comprising an expansion device, a condenser with a heat exchanger, a fuel line and a pump, and a closed flow path defined by the passage, through the expansion device, the condenser, the pump and back to the passage; wherein the fuel line is in fluid communication with the heat exchanger.

18. A method of cocooning a gas turbine engine within a hypersonic aircraft comprising:
isolating the gas turbine engine from an airframe of the hypersonic aircraft with a double walled barrier having an upstream opening and a downstream opening, the double walled barrier defining a passage between inner and outer walls;
providing thrust to the hypersonic aircraft via the gas turbine engine, wherein the gas turbine engine receives ambient air though an inlet to the gas turbine engine, compresses the air in a compressor, heats the air in a combustion chamber and expands the air in a turbine and exhausts the air from an exhaust to an ambient environment;
switching from the gas turbine engine to a secondary propulsion device;
restricting air flow through the gas turbine engine;
supplying a cooling fluid into the passage from a cooling fluid inlet proximate to the downstream opening of the double walled barrier; and
spraying cooling fluid from the passage into the gas turbine engine via a cooling fluid exit nozzle proximate to the upstream opening of the double walled barrier during a shutdown period of the gas turbine engine.

19. The method of claim 18, wherein the step of restricting air flow comprises moving a deflector in the inlet to a closed position and moving a second deflector in the exhaust to a closed position.

20. The method of claim 18, regulating the supply of cooling fluid to into the passage as a function of a core temperature of the gas turbine engine.

* * * * *